(12) United States Patent
Alleysson et al.

(10) Patent No.: US 9,838,630 B2
(45) Date of Patent: Dec. 5, 2017

(54) CMOS SENSOR WITH STANDARD PHOTOSITES

(71) Applicant: CENTRE NATIONAL DE LA RECHERCHE SCIENTIFIQUE-CNRS-, Paris (FR)

(72) Inventors: David Alleysson, Moirans (FR); Gilles Sicard, Crolles (FR)

(73) Assignee: CENTRE NATIONAL DE LA RECHERCHE SCIENTIFIQUE-CNRS-, Paris (FR)

( * ) Notice: Subject to any disclaimer, the term of this patent is extended or adjusted under 35 U.S.C. 154(b) by 90 days.

(21) Appl. No.: 14/895,561

(22) PCT Filed: Jun. 3, 2014

(86) PCT No.: PCT/FR2014/051307
§ 371 (c)(1),
(2) Date: Dec. 3, 2015

(87) PCT Pub. No.: WO2014/195622
PCT Pub. Date: Dec. 11, 2014

(65) Prior Publication Data
US 2016/0127670 A1    May 5, 2016

(30) Foreign Application Priority Data
Jun. 4, 2013  (FR) ..................... 13 55139

(51) Int. Cl.
*H04N 9/07*    (2006.01)
*H04N 5/235*   (2006.01)
(Continued)

(52) U.S. Cl.
CPC ......... *H04N 5/3742* (2013.01); *H04N 5/2351* (2013.01); *H04N 5/35554* (2013.01); *H04N 5/378* (2013.01)

(58) Field of Classification Search
CPC ............... H04N 5/3742; H04N 5/2351; H04N 5/35554; H04N 5/378
(Continued)

(56) References Cited

U.S. PATENT DOCUMENTS 6,787,749 B1 * 9/2004 Zhou .................. G11C 27/04
250/208.1
2006/0077273 A1 * 4/2006 Lee ..................... H04N 5/363
348/308

(Continued)

FOREIGN PATENT DOCUMENTS

EP    0 792 063 A1    8/1997
EP    0 926 886 A2    6/1999
(Continued)

OTHER PUBLICATIONS

Abbas et al., "Implementation analogique d'une fonction de type Michaelis-Menten pour des applications d'imagerie," Journees Nationales du Reseau Doctoral en Microelectronique, <http://www.cnfm.fr./versionfrancaise/animations/JNRDM/articles_jnrdm2012/microcapteur/Abbass-poster.pdf>, Jun. 20, 2012, 5 pages (with English language achine generated translation of abstract).

*Primary Examiner* — Lin Ye
*Assistant Examiner* — Euel Cowan
(74) *Attorney, Agent, or Firm* — Drinker Biddle & Reath LLP (57) ABSTRACT

An image sensor having photosites forming an array (K×L) of K rows and L columns, including a first set of integrator circuits, with a first regulation by analog weighting in blocks of n×n' photosites, said photosites belonging to n adjacent columns and to n' adjacent rows, and a second set of integrator circuits, with a second regulation by analog weighting in blocks of m×m' photosites, said photosites belonging to m adjacent columns and to m' adjacent rows, n adjacent columns of a first set of columns of the array being (Continued)

connected to n×n' integrator circuits of the first set, m adjacent columns of a second set of columns of the array being connected to m×m' integrator circuits of the second set, n columns of the first set alternating with m columns of the second set to form the array of photosites.

10 Claims, 6 Drawing Sheets

(51) Int. Cl.
  *H04N 5/335* (2011.01)
  *H04N 5/374* (2011.01)
  *H04N 5/355* (2011.01)
  *H04N 5/378* (2011.01)
(58) Field of Classification Search
  USPC ....... 257/53; 348/302, 308, 309, 316, 230.1, 348/266
  See application file for complete search history.

(56) References Cited

U.S. PATENT DOCUMENTS

| | | | |
|---|---|---|---|
| 2006/0197083 A1* | 9/2006 | Suzuki | G01J 1/46 257/53 |
| 2010/0091128 A1 | 4/2010 | Ogasawara et al. | |
| 2012/0147233 A1 | 6/2012 | Sakai | |
| 2012/0307120 A1* | 12/2012 | Ito | H04N 5/341 348/302 |
| 2013/0308030 A1* | 11/2013 | Fujita | H04N 5/3456 348/302 |

FOREIGN PATENT DOCUMENTS

| | | |
|---|---|---|
| EP | 2 334 054 A1 | 6/2011 |
| WO | 2013/041816 A1 | 3/2013 |

* cited by examiner

*uneven = odd

CMOS SENSOR WITH STANDARD PHOTOSITES

CROSS-REFERENCE TO RELATED APPLICATIONS

This application is the U.S. national phase of the International Patent Application No. PCT/FR2014/051307 filed Jun. 3, 2014, which claims the benefit of French Application No. 13 55139 filed Jun. 4, 2013, the entire content of which is incorporated herein by reference.

BACKGROUND

The present invention relates to an image sensor device.

Image sensor device is understood to mean any device making it possible to capture views of real objects. For example, it may be a camera, a video camera, a cellular phone equipped with a camera, etc.

For a digital device to capture images, it uses an array of photosites (also referred to herein as "pixels") which when exposed to light generate a current (or voltage) that is then converted into a digital value by an analog-to-digital converter. Photosites can, for example, include photodiodes, transistors, diodes, capacitors, resistors, etc.

The path traveled by the information contained in the image is considered to be from the entry of the light beam into the device, toward the analog or digital processing and then storage of the digital data of the image. The device therefore receives the light data before the data is processed electronically.

To adjust the sensitivity of a photosite to the amount of light in the scene to be captured, the light integration time is adjusted across the entire sensor.

However, most scenes contain light and dark areas which will not be correctly rendered if the general sensor sensitivity is set based on the average brightness of the scene. To improve image rendering, increasing the dynamic range of the images, for example from 8 to 16 bits, allows encoding a greater number of different luminance levels in an image.

However, this method is complicated because it requires having a high precision converter and a large digital file format. It also requires significant computing and memory resources.

To capture an image of a scene in the visible spectrum, cameras and video cameras adjust their sensitivity to predefined conditions (called "digital ISO" for such devices). However, a scene often contains areas of very different brightnesses. In this case, and depending on the setting selected, brightly lit areas may be saturated and appear white and/or dimly lit areas may appear black.

To improve the rendering of scenes whose dynamic ranges vary widely from one area to another, usually several images are captured at a low dynamic range (typically 8-10 bits) with various exposure factors, which are then combined to obtain a high dynamic range image (32 bits).

A tone mapping operation is then preferred for encoding this high dynamic image for display formats (8 bits). This technique therefore requires computing means, as well as memory, and poses problems when there is movement in the scene between captures.

A high dynamic range sensor (maximum 14 bits) can also be used, but the analog-to-digital converter for this is expensive, and the tone mapping must be processed.

Local adaptation has been suggested, which would allow processing the tone mapping on the fly according to local exposure conditions. In particular, an adaptive and local analog gain control has been suggested. This control is achieved, for example, by weighting the signals received from the photosites by an average corresponding to the received signals for photosites within a local area. The local regulation steps are then carried out before quantification. The regulation is therefore performed on continuous signals and does not imply any loss of information due to quantification. Satisfactory results have been obtained with such a solution, in particular with a high level of detail in dark areas, which usually have a high level of noise.

However, such control requires incorporating analog components to perform the regulation calculations.

Physically, there conventionally exists an integrator circuit for each photosite value read at a given instant. To avoid having to provide as many integrator circuits as there are photosites, sequential reads are performed, row by row, of the photosite values for all the columns. There are thus as many integrator circuits as there are columns. For example, for a photosite array of K rows and L columns, we will first read the L values of the first row, then the L values of the second row, etc. It is thus possible to reduce the number of integrator circuits to L.

In particular, the analog calculation of an average value corresponding to a local area requires having all the photosite values of this local area simultaneously. It is thus no longer possible to have as many integrator circuits as there are columns. For example, to have the photosite values simultaneously for a square of four photosites, there must be 4 integrator circuits: two for the first row and two for the second row. At the scale of the photosite array, there must be two times as many integrator circuits as for normal sensors. It is therefore necessary to provide additional locations for these additional components in the design drawings (the "layout").

To find available room for these additional components, it has been suggested to include these components within the photosite array itself. For example, it has been suggested to calculate the local average over a "blind" photosite of the photosite array. Other implementations where the regulation means are directly included in the photosite array have also been proposed.

However, the design of photosite arrays is extremely specific and optimized, in particular in relation to the resolution of the captured images. It is therefore very complex and expensive to place, directly on the sensor, a blind photosite or regulation means for each area to be regulated.

Furthermore, the addition of the blind photosite or regulation means decreases the fill factor of the photosite (ratio between the photosensitive surface area of the photosite and the total surface area of the photosite). This results in a decrease in the electro-optical performance of this photosite, and thus impacts the overall performance of the sensor.

SUMMARY

The invention improves the situation.

For this purpose, it proposes a sensor architecture in which the additional components required for local regulation are located on the periphery of the photosite array, in an alternating manner.

The present invention therefore relates to an image sensor device, comprising a plurality of photosites forming an array (K×L) of K rows and L columns, and at least one analog-to-digital converter, each photosite being adapted to receive a luminous flux and to deliver an electrical signal, in analog form, further comprising at least:
- a first set of integrator circuits, with a first regulation by analog weighting in blocks of n×n' photosites, the photosites belonging to n adjacent columns and to n' adjacent rows, and
- a second set of integrator circuits, with a second regulation by analog weighting in blocks of m×m' photosites, the photosites belonging to m adjacent columns and to m' adjacent rows, n adjacent columns of a first set of columns of the array being connected to n×n' integrator circuits of the first set, m adjacent columns of a second set of columns of the array being connected to m×m' integrator circuits of the second set, n columns of the first set alternating with m columns of the second set to form the array of photosites.

Regulation is thus carried out in the integrator circuits. The architecture of the array of photosites is therefore not changed. Direct use of a photosite array that is mass produced and conventionally used for standard sensors is therefore possible. Design costs are thus reduced. Local analog regulation does not interfere with the other usual issues of photosite arrays (for example the resolution, fill factor, etc.). In addition, it is possible to use conventional integrator circuits (for example integrator circuits of conventional width).

Here, the additional analog components are associated with the integrator circuits of the photosite array. The number of integrator circuits is therefore increased. These integrator circuits are located downstream of the array and upstream of a digital analog conversion.

However, the alternating arrangement of the sets of columns connected to two sets of integrator circuits reduces the effects of this increase in the number of integrator circuits.

On the one hand, the separation of the integrator circuits simplifies the design of the device. It is thus possible to physically separate these integrator circuits. Such separation significantly simplifies the architectural design of the periphery of the photosite array. In one non-limiting example, the two sets of integrator circuits are arranged one atop the other. In another example, one set is located under the array and the other is adjacent to the array. In another example, the circuits are arranged one on either side of the photosite array.

On the other hand, the alternating arrangement of the sets of columns reduces the impact of the separation of the integrator circuits on the operation of the device. The distances between the array and the integrator circuits are advantageously reduced by the alternating arrangement of the sets of columns. In fact, it is easy to place an integrator circuit very close to the column to which it is connected in this configuration. In addition, the regularity introduced by this arrangement allows time management similar to that of a conventional image sensor. Sequential reads remain possible because each set of integrator circuits is connected to each row.

In one embodiment, the first set of integrator circuits is attached to a first end edge of the array, at the bottom of the columns, and the second set of integrator circuits is attached to a second end edge of the array, opposite to the first edge, at the top of the columns.

The integrator circuits are thus advantageously distributed on either side of the photosite array. This distribution frees twice as much space for the integrator circuits. Each set of integrator circuits can thus partly correspond to the integrator circuits normally used for a conventional sensor, without local analog regulation. Typically, the column amplifiers comprised in these integrator circuits can be identical to those conventionally used. Their arrangement can also be similar to what is conventionally suggested. The sensor design is therefore greatly simplified. Typically, K and L are even integers.

In addition, it is unnecessary to provide components of smaller size. Such components are expensive and can generate distortion. In particular, the column amplifiers used to process data received from the photosite array can be the ones conventionally used.

"Bottom of the columns" is understood to mean the area below the photosite array when the array is viewed from above. This representation is adopted for example in FIGS. 2, 3A, 3B, and 3C. The term "top of the columns" is understood to mean the area above the photosite array when the array is viewed from above.

In one embodiment, the integrator circuits of the two sets comprise:
- computing means suitable for delivering an analog signal corresponding to an average of the analog signals delivered by the blocks of n×n' photosites and, respectively, by the blocks of m×m' photosites, and
- at least one regulation means for weighting an analog signal from each photosite by an average signal of a block to which the photosite belongs.

The regulation is thus carried out in the integrator circuits. The architecture of the photosite array is not changed.

In one embodiment, the device comprises at least as many regulation means as simultaneously read photosites and at least as many converters as simultaneously read photosites.

The analog calculation of an average value corresponding to a local area requires having all the photosite values for this local area simultaneously. Typically, these local areas correspond to the blocks of photosites. The term "simultaneously read photosites" is therefore understood to mean all photosites comprised in all the blocks read together (typically at each clock pulse). For example, for square blocks of 4 photosites (n=n'=m=m'=4), the entire first row of blocks is read. Because each block comprises two rows of photosites, this first row of blocks corresponds to the first two rows of photosites of the array.

The photosite arrays may comprise several million pixels. The regulating means and the converters must therefore simultaneously manage all the values read by all the simultaneously read photosites. The presence of one regulating means and one converter per simultaneously read photosites allows dividing the number of operations to be performed simultaneously. In effect, all the operations required by a photosite are processed by a regulation means and a converter. The speed of processing the data received from the photosite array is therefore advantageously accelerated. Such a configuration is suitable, for example, for a sensor used in a video recording device and particularly for a recording device requiring a high capture rate.

In addition, components capable of processing a large amount of data simultaneously are very expensive. It may thus be more economical to provide a large number of inexpensive components than a few very expensive components.

In a variant, the device comprises fewer regulation means than simultaneously read photosites, and fewer converters than simultaneously read photosites.

A large number of regulation means and converters makes it possible to accelerate the processing speed. However, each of these components introduces distortion into the signal received by the photosite array. The multiplication of these components therefore has the effect of degrading the signal received from the array. A compromise between processing speed (larger number of components), component price, and received signal quality (fewer components) is thus advantageously selected according to the chosen applications for the device.

In a variant, the device comprises a single regulation means for all the photosites and a single converter for all the photosites. The signal then undergoes very little distortion.

Such a configuration is, for example, suitable for the aerospace field, where a small number of photosites or a low read speed can be relevant. The regulation means and conversion means are thus able to process the data at a reasonable rate while providing high quality processing.

In one embodiment, the set of integrator circuits is symmetrical on either side of the array. The design of the device is thus advantageously simplified. In addition, the costs associated with production of the device are reduced. For example, the design of the portion located at the bottom of the array columns can simply be reused at the top of the array columns. In addition, the same production line can for example be used to produce the portions located at the bottom and top of the columns.

In one embodiment, the first set of integrator circuits and the second set of integrator circuits operate in synchronization. Time management is therefore advantageously simplified. The data received from the photosites and then processed (regulation, conversion, etc.) for the first and second sets are thus directly gathered together to be interpreted by the digital means of the sensor downstream of the convertor or converters. There is no need to add components to handle a possible timing difference. In addition, the time characteristics of the device are advantageously similar to those of a conventional sensor having no local analog regulation. Integration of such a device is thus transparent to the manufacturer.

In one embodiment, $n=m=n'=m'=2$. A compromise is thus reached between the regulation precision and the complexity of the architecture to be implemented in order to carry out such regulation.

In one embodiment, the sets of integrator circuits further comprise at least one means for compensating for fixed pattern noise (FPN). The occurrence of fixed pattern noise is thus advantageously reduced.

Such compensation means may advantageously be located upstream of the average calculation means. This compensation is then also applied to the average and enables a more precise regulation.

In one embodiment, the integrator circuits comprise at least one means for sampling and holding analog signals. As the regulation means may, for example, comprise an analog divider, it is advantageous to supply such regulation means with constant analog signals.

The image sensor device of the invention can therefore easily be integrated with image capture devices (such as a digital camera, digital video camera, etc.):
- the photosite remains identical to the original photosite. Conventional photosite arrays can be directly used with the present device.
- the column amplifiers remain identical to those conventionally used.
- the processing implemented and the architecture proposed have no effect on the read speed. The number of frames per second ("frame rate") remains that of a conventional sensor.
- the processing implemented and the architecture proposed have no effect on the temporal operation of the imager. The imager remains entirely conventional and the reading of photogenerated data occurs in the usual manner.
- the same is true for the compensation for fixed pattern noise.
- there is also no effect on the image processing applied for reconstructing colors, and this will remain the same as for a standard sensor. However, reconstruction of the final image will be simplified because there will be less noise and the appearance of the image will already be good, simplifying the algorithms for improving its appearance (noise reduction, gamma function, etc.).

BRIEF DESCRIPTION OF THE DRAWINGS

Other features and advantages of the invention will become apparent from reading the following description given by way of illustrative example, and from examining the accompanying drawings in which.

DETAILED DESCRIPTION

Figure 1A:
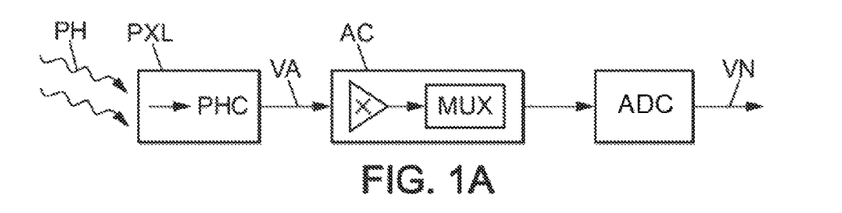
FIG. 1A illustrates a general view of the processing of a signal, showing the sequence from a photosite PXL generating a photocurrent PHC to a digital voltage value VN.
Figure 1B:
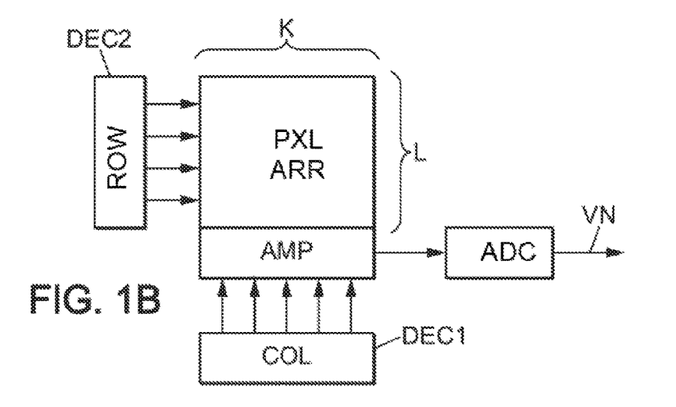
FIG. 1B illustrates a pixel array K×L and its periphery, with a conventional processing.

In one embodiment illustrated in FIG. 1A, a conventional sensor comprises a plurality of photosites (k, l), with k ranging from 1 to K and with l ranging from 1 to L. Typically K=L and K and L are even values. Each photosite PXL converts light energy PH into photocurrent PHC, in order to deliver an analog voltage VA. A column amplifier AC comprises a sample-and-hold function for collecting all the analog voltages from the various photosites, and the resultant voltage is applied via a multiplexer-type function to an analog-to-digital converter ADC in order to supply a digital voltage VN. Referring to FIG. 1B, the photosite array (denoted PXL ARR and also called a "sensor" hereinafter) is therefore conventionally connected to a column decoder DEC1 and to a row decoder DEC2. The signal from the array is amplified (AMP) and converted to a digital voltage VN.

Figure 2:
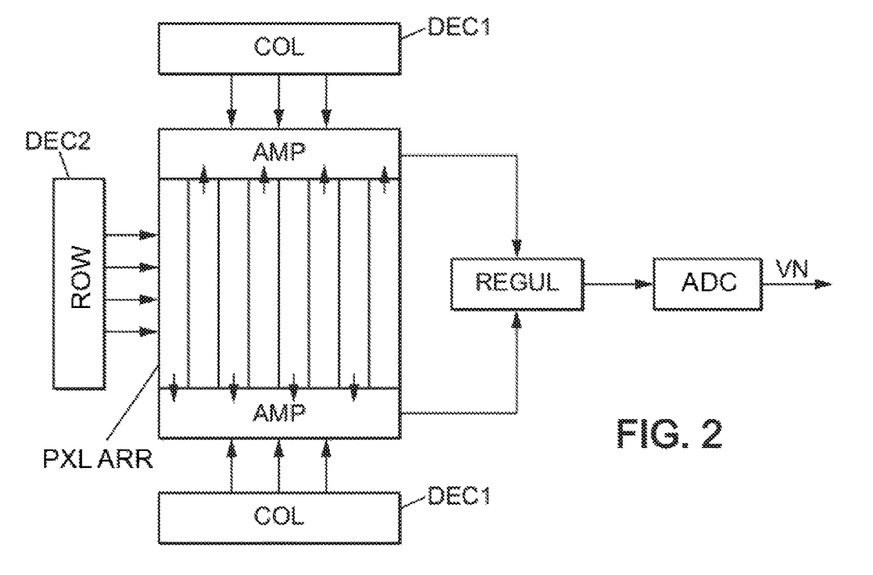
FIG. 2 illustrates a pixel array K×L and its periphery, with processing according to the invention.

Referring now to FIG. 2 which shows an application of the method according to the invention, the sensor PXL ARR is equipped with means for measuring the response V (in voltage or current) of a set of N neighboring pixels. This response is used to estimate local brightness in the scene. In particular, a parameter X0 is measured which corresponds to a local luminance, in order to adapt the dynamic range of a photosite or of a group of N neighboring photosites. This luminance can be estimated by the average (simple or advantageously weighted, for example) of signals from the photosites or "pixels."

The sensitivity of a photosite is then regulated using an adaptive non-linear function F(X,X0), the shape of its non-linearity (its local "slope") being dependent on said average parameter X0, where X is the voltage from this photosite. The regulation can be done for example in analog before the analog-to-digital conversion ADC.

Thus, in one embodiment, for one implementation of the invention we adapt a conventional sensor, such as a standard CMOS imager (mass produced) which normally consists of four distinct parts:

- a pixel array PIX ARR, each pixel comprising a photo-diode and three to five MOS transistors; these pixel structures can convert a current generated in the photodiode into voltage; the most complex structures also allow storing the image in memory within the pixel itself (known as the "global shutter" technique);
- two rows AMP of column amplifiers respectively situated at the bottom of a first set of pixel columns and at the top of a second set of pixel columns. These amplifiers are responsible for shaping the voltage values issuing from each pixel, eliminating voltage variations caused by manufacturing discrepancies (fixed pattern noise or "FPN") and for transferring the voltage values;
- a photosite sensitivity regulation module comprising for example the function F(X,X0);
- an analog-to-digital converter ADC;
- digital decoders for the rows DEC1 and columns DEC2, defining a read sequence for all the pixels of the array.

As presented below, both the increase in the dynamic range of inputs to the sensor and the adaptation to the average lighting conditions are advantageously improved, while the general physical architecture of a conventional sensor is retained.

An embodiment is now described with reference to FIG. 3A. In this embodiment, n=n'=m=m'=2. The image sensor device shown in FIG. 3A comprises:

- a pixel array PIX ARR, each pixel having an index k, l such that k is the pixel row and l is the pixel column;
- two rows AMP of column amplifiers positioned one on either side of the array and respectively connected to a first set of pixel columns and to a second set of pixel columns. Each of the rows AMP comprises L column amplifiers AC receiving pixel data $X_{k\ even,\ \alpha}$ and L column amplifiers AC receiving pixel data $X_{k\ odd,\ \alpha}$, with, for i∈

$$\left[1; \frac{L}{2}\right]$$

$$\alpha = \begin{cases} 2^{2i-1} - 1 \text{ or } 2^{2i-1} & \text{for amplifiers at the bottom of the column} \\ 2^{2i} - 1 \text{ or } 2^{2i} & \text{for amplifiers at the top of the column} \end{cases}$$

The term "k even" is understood to mean all even integers k within [0, K], and the term "k odd" to mean all odd integers k within [0, K].

- two modules READ AC for sequentially reading the column amplifiers;
- computing means GEN X0 suitable for supplying an analog signal corresponding to an average $X0_{block}$ of the analog signals delivered by the blocks of 2×2 photosites of the first set of columns and, respectively, by the blocks of 2×2 photosites of the second set of columns,
- two modules READ X0 for sequentially reading the averages;
- a regulation means REGUL for weighting an analog signal $X_{k,\ l}$ from each photosite by an average signal $X0_{block}$ of a block to which said photosite belongs.
- an analog-to-digital converter ADC providing a digital signal VN as output.

Functionally, an odd row and an even row are selected at the same time and their data are sent grouped in blocks of four, alternately to the bottom column amplifiers and to the top column amplifiers. As this data transfer occurs in parallel, the data transfer rate to the analog-to-digital converter ADC can be maintained (in comparison to a conventional operation) simply by correctly sequencing the read blocks of the column amplifiers.

The average of each block $X0_{block}$ is calculated immediately after the data are loaded into the column amplifiers. These average values are read in synchronization with the data of the array so that the calculation in the regulation block is performed at the right moment.

In this embodiment, a single regulation means applies weighting to the signals from the photosites. Similarly, a single converter is used. Such a configuration is of particular interest for arrays with a relatively small number of photosites (for example 640×480 photosites). The components (regulator and/or converter) must simultaneously process a large number of photosite data. To avoid reducing the processing speed or increasing the costs, it is advantageous but non-limiting to use such a configuration with sensors having relatively few photosites.

Figure 3A:
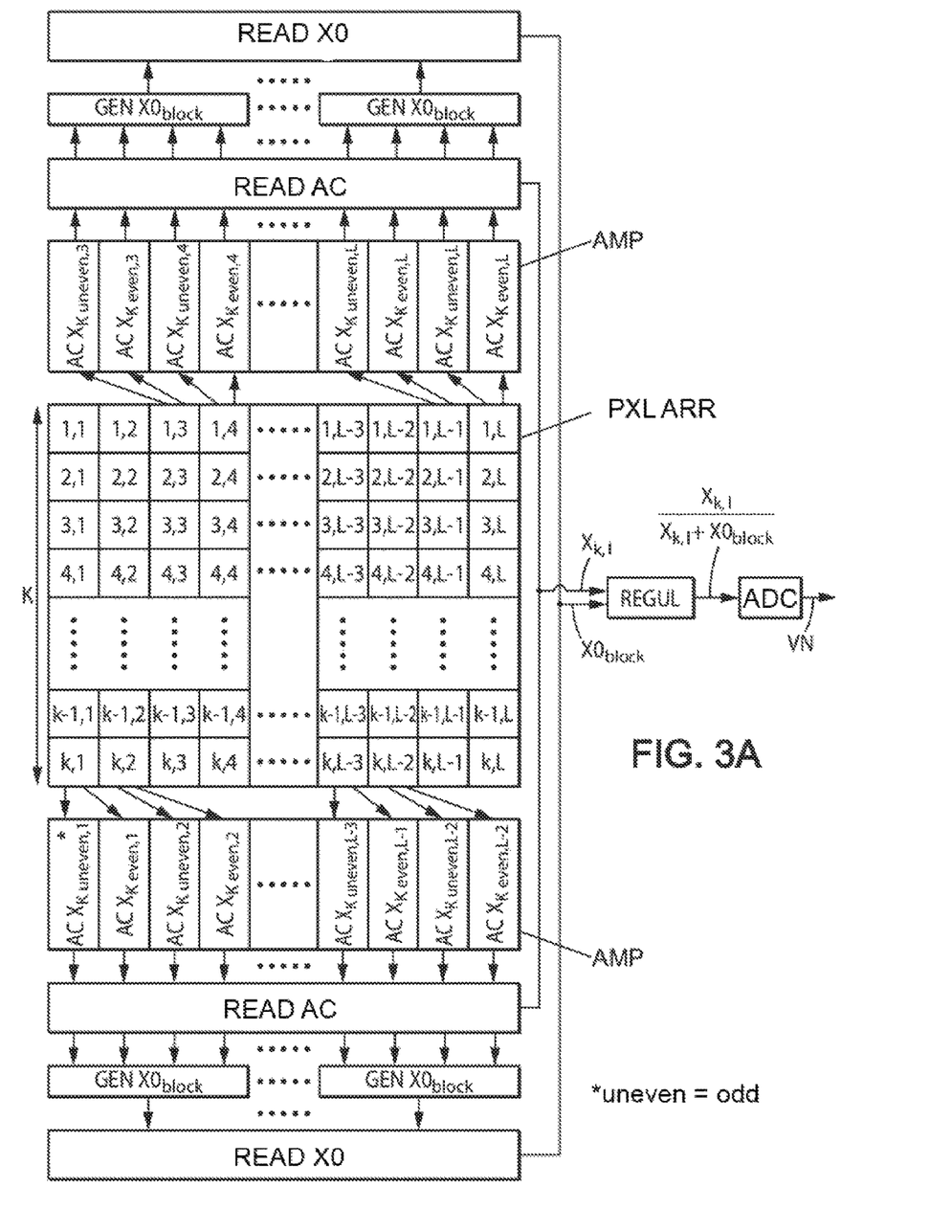
FIG. 3A illustrates the details of a device according to the invention, in one embodiment.

The design shown in FIG. 3A shows great regularity, which will be true of the circuit layout at its true scale. This optimizes the design time for the sensor.

Figure 3B:
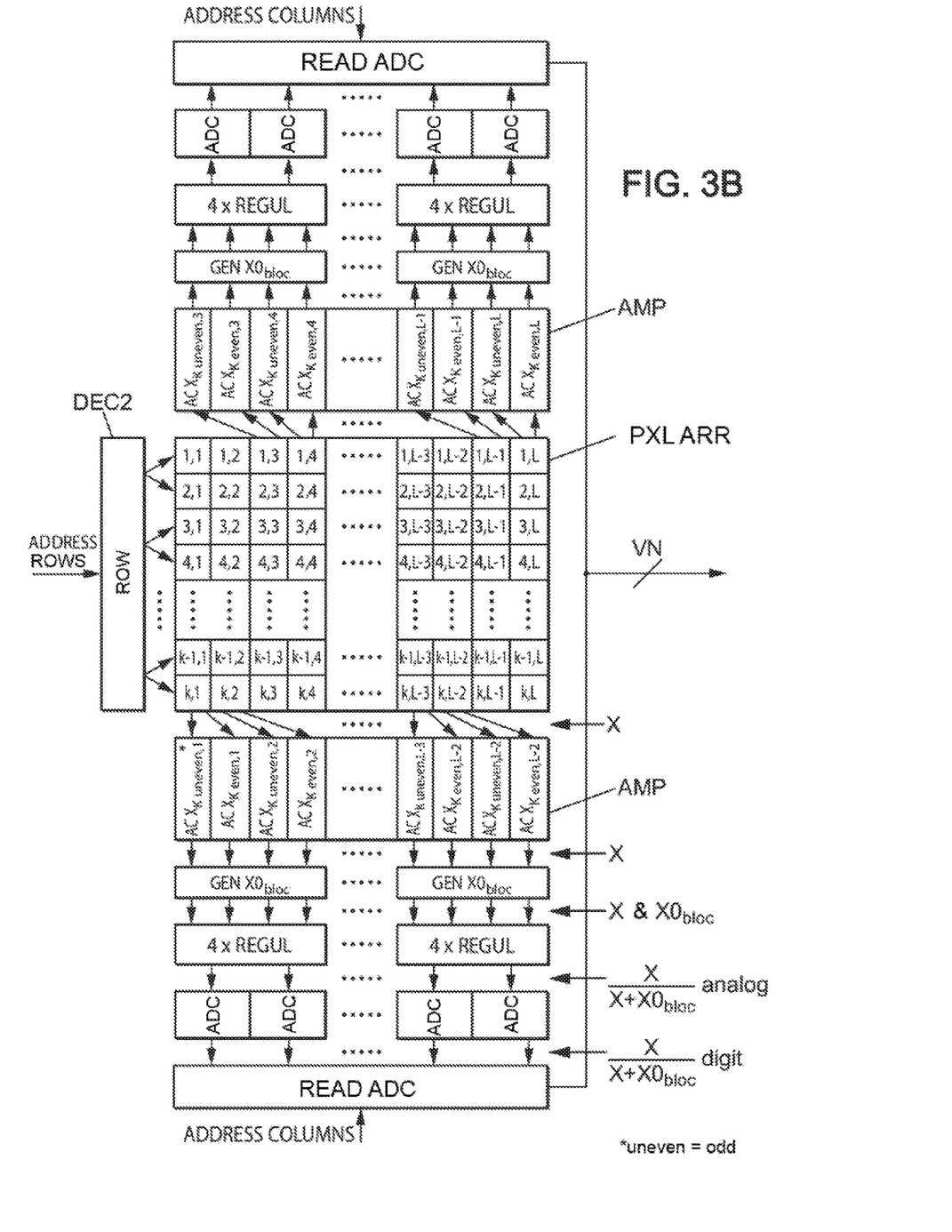
FIG. 3B illustrates the details of a device according to the invention, in one embodiment.

A variant of this embodiment will now be described with reference to FIG. 3B. In this variant, n=n'=m=m'=2. In this embodiment, the photosite signals are processed successively and read sequentially once converted into digital signals.

First, a digital module DEC2 sequentially selects the rows to be activated. For example, a plurality of switches corresponding to two rows of photosites (here we simultaneously read L×2 photosites corresponding to a row of blocks which is two rows of pixels) can be triggered at the same time t. The signal X from a photosite of the array PXL ARR is first processed in a column amplifier comprised in a row of column amplifiers AMP and then an average value X0 is generated by computing means GEN X0 from four signals from a block of photosites (here n=n'=m=m'=2). Next, the photosite signals X and the corresponding average values X0 are transmitted to a plurality of regulation means 4×REGUL. Regulation of the signals X is then performed using a variable function F(X,X0). In one exemplary embodiment, this function is F(X, X0)=X/X+X0. In another embodiment, it is an adaptive non-linear function. The regulated signals are then converted into digital form by a converter ADC. Finally, these digital signals are sequentially read in order to reconstruct the entire image.

In this variant, there are as many converters as there are simultaneously read photosites. In the case where a single converter ADC is present for all of the photosites, it can be difficult to maintain an acceptable processing speed. Indeed, for a sensor with a high number of photosites, the converter ADC must process large amounts of data very quickly in order to accommodate the desired number of frames per second. It may therefore be advantageous to provide a larger number of converters ADC so that the processing speed is maintained even if the number of photosites is increased. Such a configuration is therefore also suitable for an array having a large number of photosites (for example 2,826 megapixels) because the converters still only need to simultaneously manage their photosite (however, the number of converters is substantially increased). It is possible to provide one converter ADC per simultaneously read photosite, meaning twice as many converters ADC as photosites.

Figure 3C:
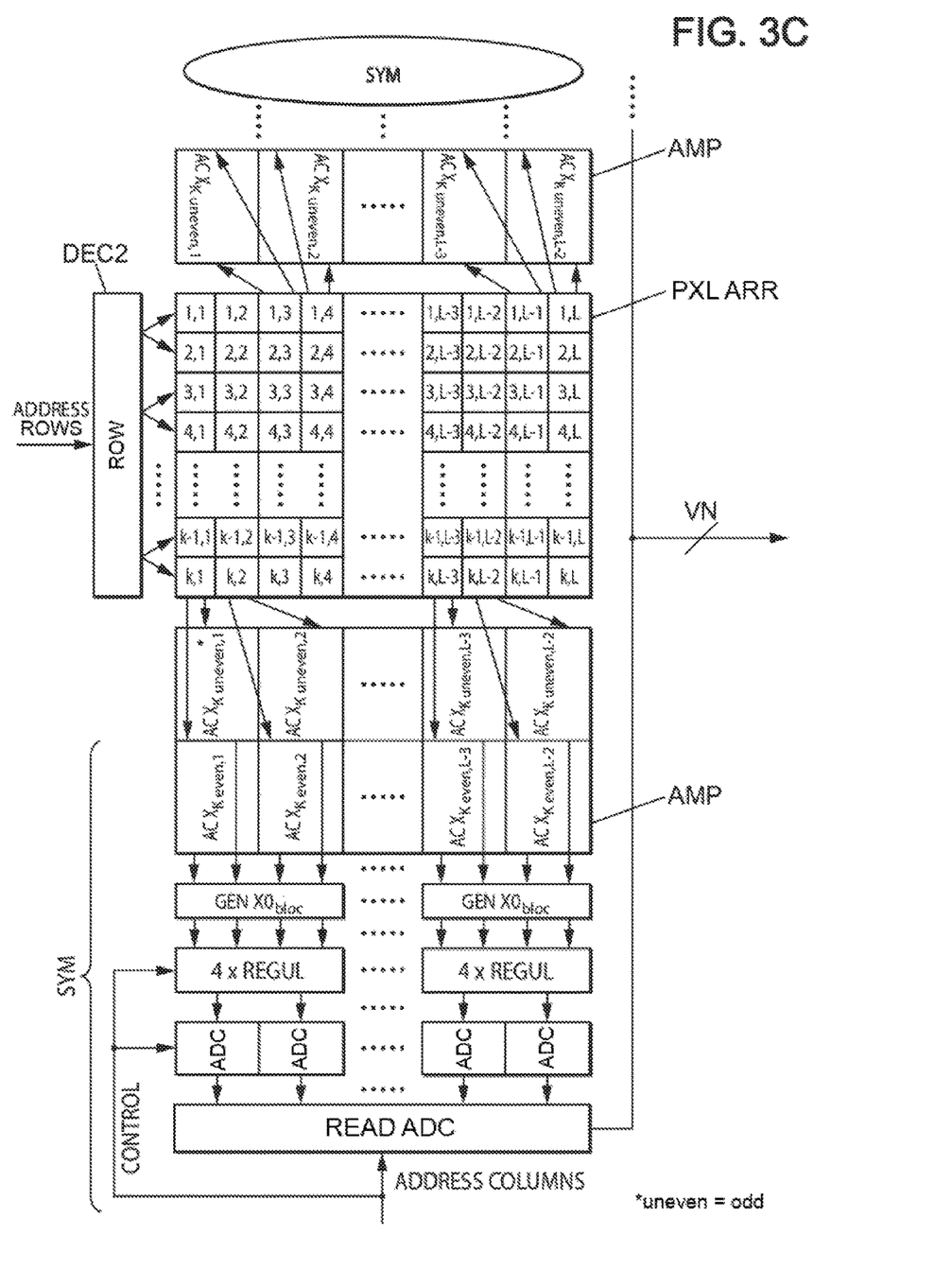
FIG. 3C illustrates the details of a device according to the invention, in one embodiment.

A variant of this embodiment is now described with reference to FIG. 3C. In this variant, n=n'=m=m'=2. In this embodiment, the size of the photosites is so small that an amplifier AMP is drawn across the width of two pixels. In this case, two rows of amplifiers AMP must be provided at the bottom of the columns and at the top of the columns. In this embodiment, as many converters ADC are used as there are simultaneously read photosites in the array.

A compromise between processing speed (large number of components), component price, and quality of the received signal (few components) is thus advantageously but not exclusively chosen.

Figure 4A:
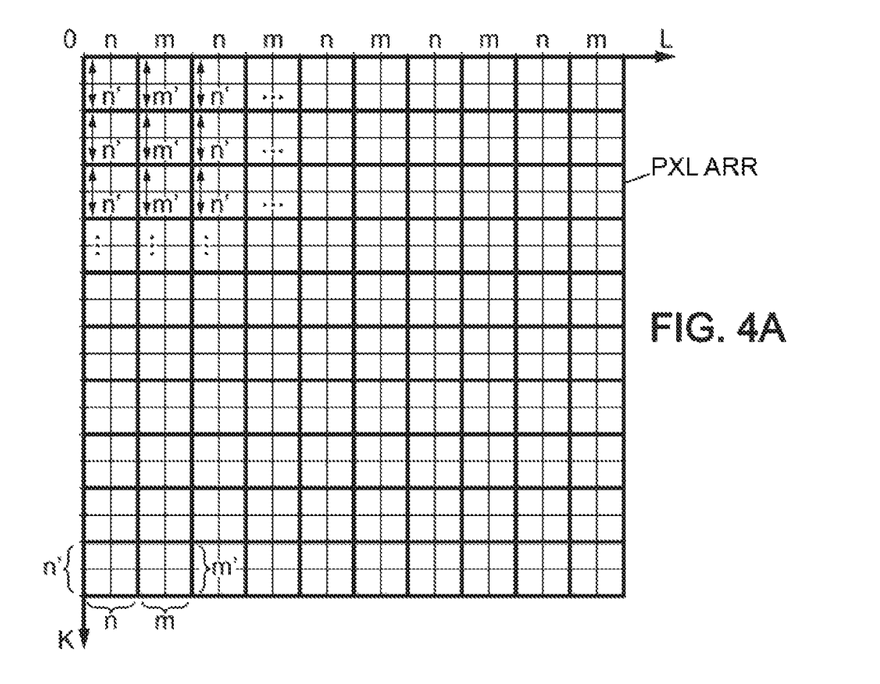
FIG. 4A illustrates a pixel array K×L with a distribution according to the invention, in one embodiment.

One embodiment is now described with reference to FIG. 4A. This figure shows the photosite array PXL ARR and illustrates one possible configuration for the blocks of photosites.

In this embodiment, n=n'=m=m'=2. The blocks therefore comprise four adjacent photosites forming a square. When receiving data, the photosites of an entire block row are read simultaneously. Here, a block row contains K×2 photosites. A photosite signal is weighted by the average of the photosite signals of the block of this photosite. Thus, the sensitivity of a photosite is modulated here by the signals received by three of its neighbors.

Such a configuration offers at least two advantages. Firstly, the number of simultaneously read photosites is reduced. As the averages are calculated from a block of four adjacent photosites, only two photosite rows are read simultaneously. Secondly, such a configuration makes it possible to have symmetry of the integrator circuits located downstream of the photosite array. One will recall that a first set of integrator circuits is connected to a first set of columns and that a second set of integrator circuits is connected to a second set of columns. In this case n=m and n'=m', and the two sets of columns are therefore identical. However, the integrator circuits are connected to identical sets of columns. It is therefore possible to provide symmetry between the two sets of integrator circuits.

Figure 4B:
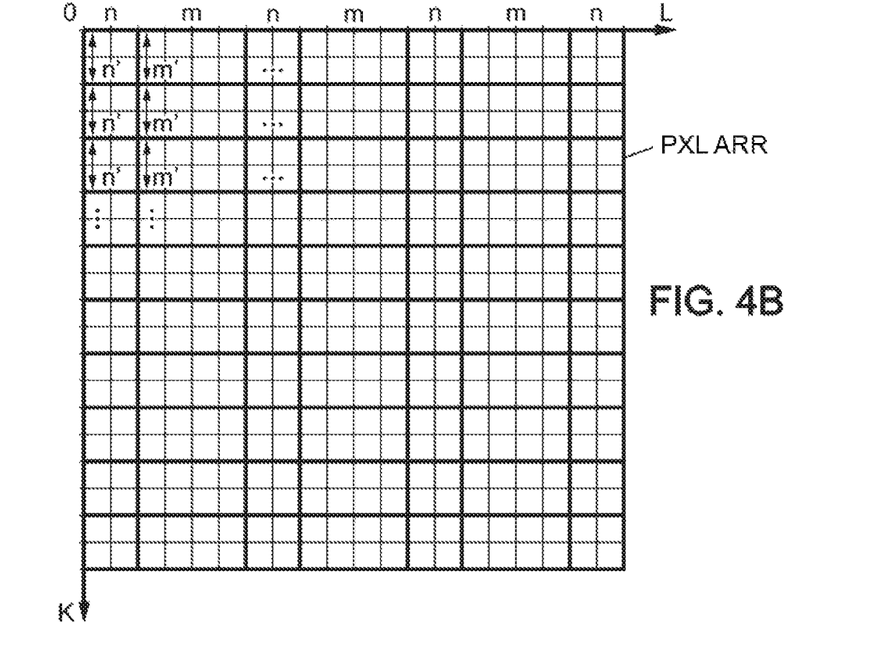
FIG. 4B illustrates a pixel array K×L with a distribution according to the invention, in one embodiment.

In one variant with reference to FIG. 4B, n=n'=2, m=4, and m'=2. The blocks of the first and second sets of columns are therefore different here. However, the number of simultaneously read photosites remains the same. This facilitates management of the temporal aspects of the design of the device. The difference between the blocks of the first and second sets of columns introduces an irregularity in the processing applied to the signals received from the photosites. Such an irregularity can improve the processing by limiting the appearance of artifacts. The periodic nature of some sensors can result in the generation of noise during digital reconstruction of the image. The introduction of such irregularities makes it possible to improve the quality of the reconstructed images.

Figure 4C:
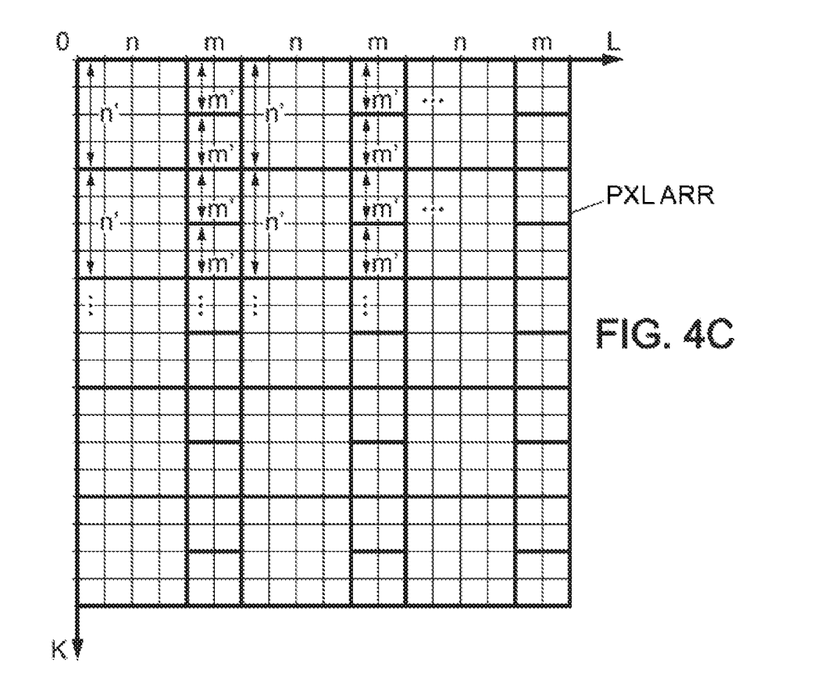
FIG. 4C illustrates a pixel array K×L with a distribution according to the invention, in one embodiment.

In another embodiment with reference to FIG. 4C, n=n'=4 and m=m'=2. The blocks of the first and second sets of columns are therefore different here. In addition, temporal management in such an architecture requires a specific design. For example, it can be arranged so that two blocks of the second set of columns are processed (m×m' blocks) for one block of the first set (n×n' blocks). Such an architecture introduces significant irregularities and therefore further limits the appearance of artifacts.

Figure 4D:
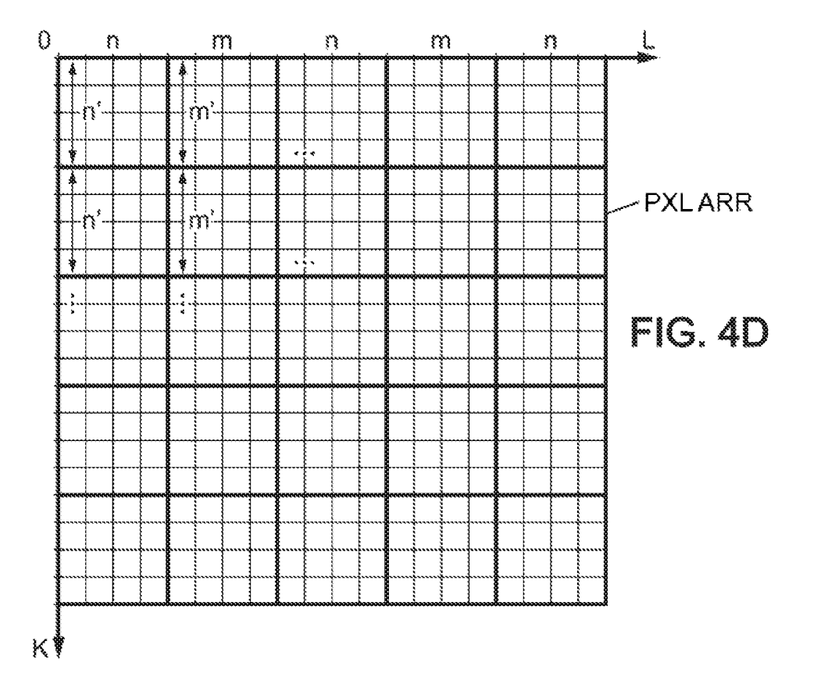
FIG. 4D illustrates a pixel array K×L with a distribution according to the invention, in one embodiment.

In another embodiment with reference to FIG. 4D, n=n'=m=m'=4. The blocks therefore comprise sixteen adjacent photosites forming a square. When receiving data, the photosites of an entire block row are read simultaneously. Here, a block row contains K×4 photosites. Here, it is possible to provide symmetry between the two sets of integrator circuits. In addition, the average is calculated from a larger number of photosites. This average value is thus more representative than with blocks of 4 photosites. In fact, the smoothing of erroneous photosite values is more effective using an average of 16 values than an average of 4 values.

Of course, the present invention is not limited to the embodiment described above; it extends to other variants.

For example, a simple average in calculating the function F has been described above. However, an alternative can be to calculate a weighted average according to selected rules. Even more generally, convolution functions more complex than a simple average can be provided.

An embodiment has been described above in which the integrator circuits are distributed on either side of the photosite array. Of course, it is also possible to envisage architectures in which the integrator circuits are distributed differently at the periphery of the photosite array.

An embodiment has been described above that is based on sequentially reading the photosite array. Of course, it is also possible to consider simultaneously reading all the photosites of the array.

The invention claimed is:

1. An image sensor device, comprising a plurality of photosites forming an array (K×L) of K rows and L columns, and at least one analog-to-digital converter, each photosite being adapted to receive a luminous flux and to deliver an electrical signal, in analog form, further comprising at least:
  a first set of integrator circuits, with a first regulation by analog weighting in blocks of n×n' photosites, said photosites belonging to n adjacent columns and to n' adjacent rows, and
  a second set of integrator circuits, with a second regulation by analog weighting in blocks of m×m' photosites, said photosites belonging to m adjacent columns and to m' adjacent rows,
  n adjacent columns of a first set of columns of the array being connected to n×n' integrator circuits of the first set,
  m adjacent columns of a second set of columns of the array being connected to m×m' integrator circuits of the second set,
  n columns of the first set alternating with m columns of the second set to form the array of photosites;
the device comprising, in each of said first and second sets:
  computing means suitable for delivering an analog signal corresponding to an average of the analog signals delivered by said blocks of n×n' photosites and, respectively, by said blocks of m×m' photosites, and
  at least one regulation means for weighting an analog signal from each photosite by an average signal of a block to which the photosite belongs.

2. The device according to claim 1, wherein the first set of integrator circuits is attached to a first end edge of said array, at the bottom of the columns, and the second set of integrator circuits is attached to a second end edge of said array, opposite to the first edge, at the top of the columns.

3. The device according to claim 1, comprising at least as many regulation means as simultaneously read photosites and at least as many converters as simultaneously read photosites.

4. The device according to claim 1, comprising fewer regulation means than simultaneously read photosites and fewer converters than simultaneously read photosites.

5. The device according to claim 4, comprising a single regulation means and a single converter for the entire photosite array.

6. The device according to claim 1, wherein said sets of integrator circuits are symmetrical on either side of the array.

7. The device according to claim 1, wherein said first set of integrator circuits and said second set of integrator circuits operate in synchronization.

8. The device according to claim 1, wherein $n=m=n'=m'=2$.

9. The device according to claim 1, wherein said sets of integrator circuits further comprise at least one means for compensating for fixed pattern noise.

10. The device according to claim 1, wherein said integrator circuits comprise at least one means for sampling and holding analog signals.

* * * * *